April 14, 1964 N. CORDIS 3,128,877
POULTRY FEEDER WITH RECIPROCABLE CONVEYOR
Filed Sept. 8, 1958 3 Sheets-Sheet 1
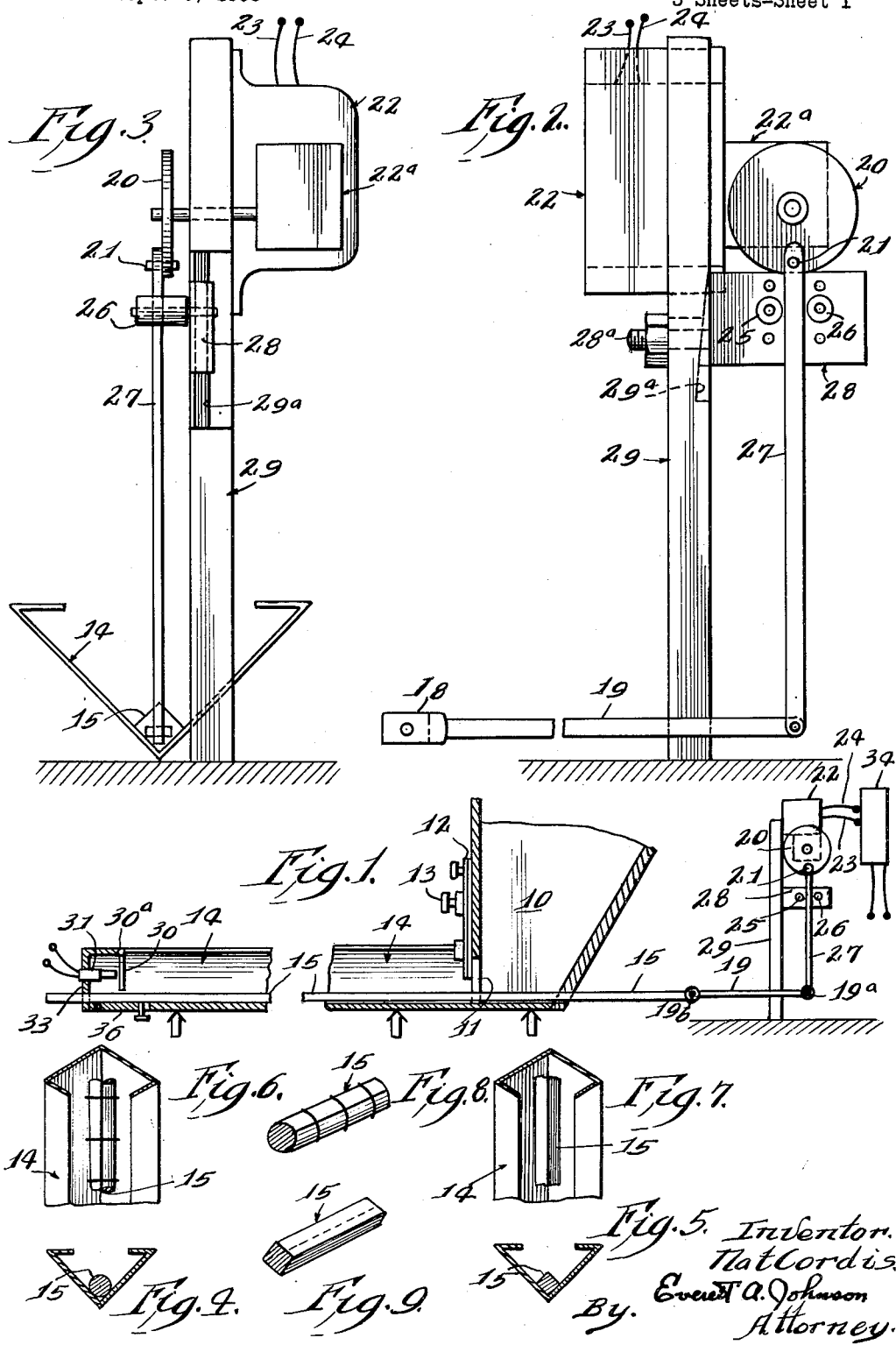

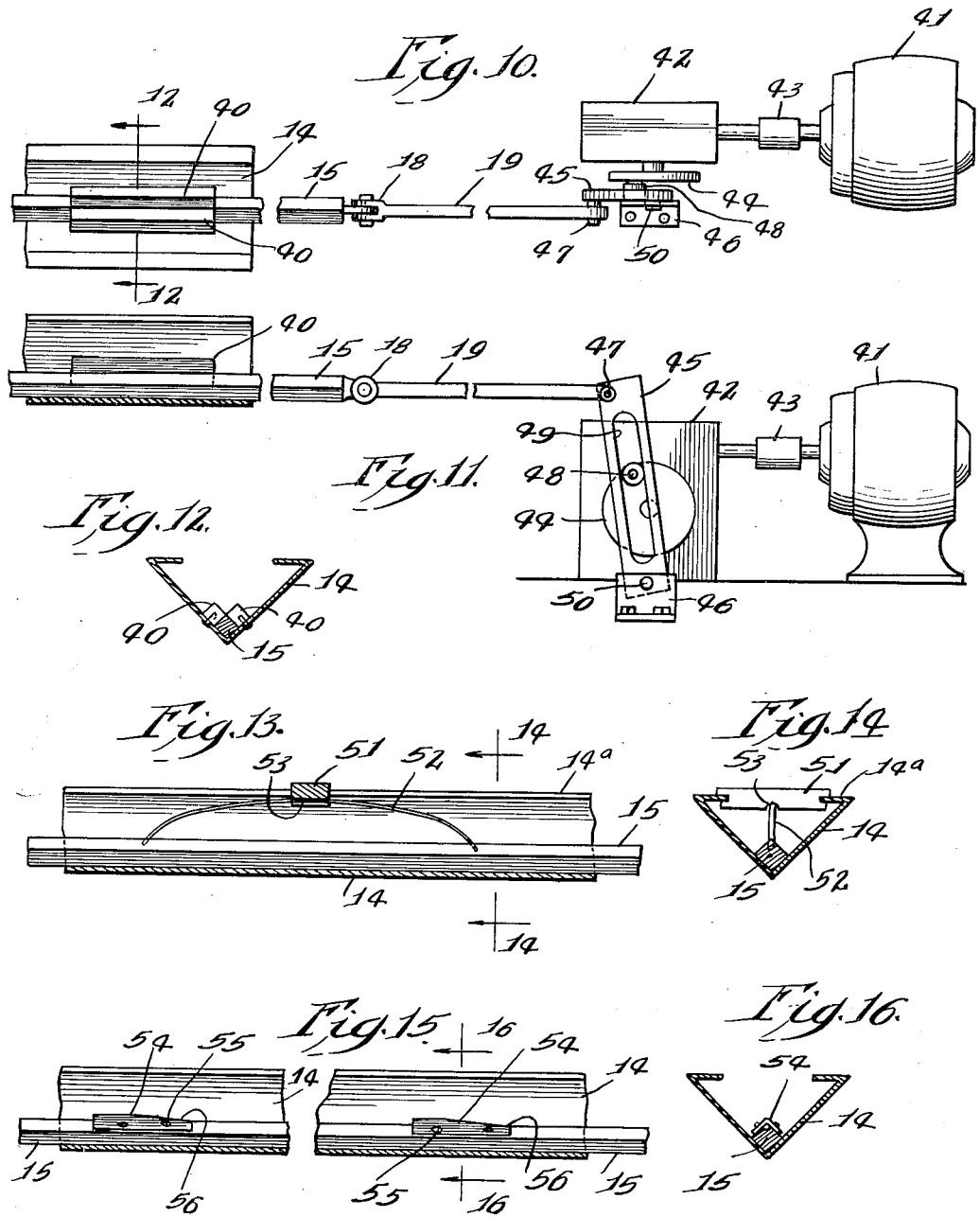

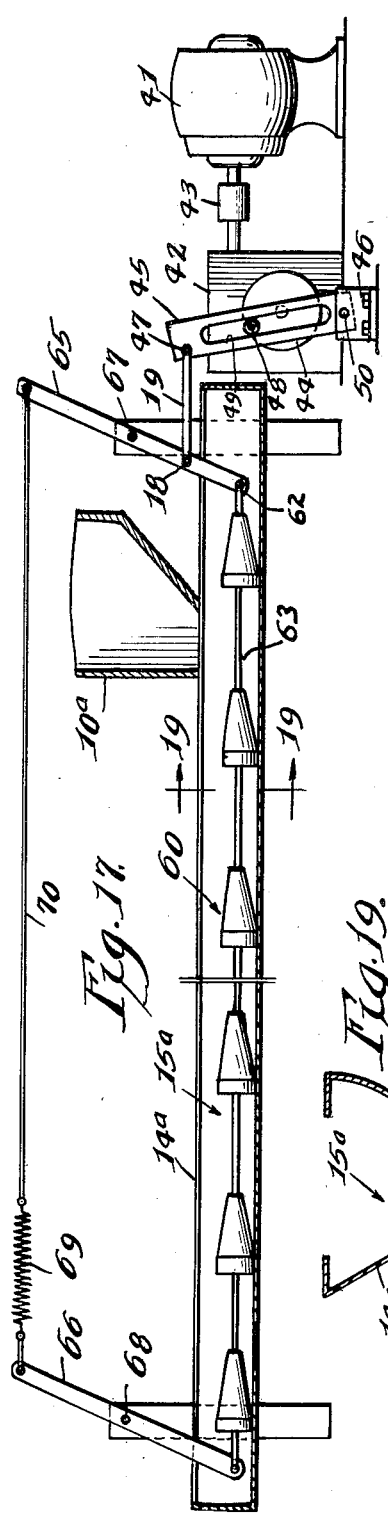

United States Patent Office 3,128,877
Patented Apr. 14, 1964

3,128,877
POULTRY FEEDER WITH RECIPROCABLE CONVEYOR
Nat Cordis, Crown Stock Farms, Silver Lake, Wis.
Filed Sept. 8, 1958, Ser. No. 759,464
20 Claims. (Cl. 198—224)

This invention relates to conveyors for flowable solid materials and, more particularly, to a feeding device for distributing such materials along a trough accessible to stock and poultry. Still more specifically, the invention is an improvement in a method and means for automatically distributing feed in trough-type animal feeders.

The problem of controlled feeding of live stock, such as poultry, on a large scale necessarily involves much manual attention. It is, therefore, a primary object of this invention to provide a feeder of large capacity in which the supply can be maintained with a minimum of manual attention. Another object is to provide a method and an automatic means for uniformly distributing an adequate supply of fresh feed within a flock feeder. A further object is to provide a paddle-free feeder of rugged and inexpensive construction. Still another object is to provide an apparatus which maintains a fresh supply of feed in a trough and avoids clogging with stale feed. A further important object of my invention is to provide a means for automatically controlling the starting of the feed distributing apparatus at selected intervals and for stopping the distributing apparatus when feed has been advanced uniformly throughout the trough system. These and other objects of the invention will become apparent to those skilled in the art as the description of my invention proceeds.

Briefly, the objects of the invention are attained by providing a trough having a portion thereof in communication with a hopper and a conveyor member within the trough which is oscillated adjacent the bottom thereof in a to-and-fro movement. A drive means for the elongated conveying member, bar, or the like provides for reciprocation which may have a slow advance and a rapid return stroke. On the delivery stroke the bar is moved forward, carrying feed with it. On the return stroke the conveyor preferably moves two to four times faster and is rapidly pulled from under the advanced feed which remains in place by its inertia. Feed is discharged from the hopper into the trough at a controlled rate and withdrawal from the hopper is regulated by the rate at which the feed is advanced within the trough as determined by the conveying motion of the reciprocating conveyor which may have a stroke of from two to six inches, or longer as desired.

Further details of the invention will be described by reference to the accompanying drawings wherein:

FIGURE 1 is a schematic elevation, partly in section, showing the general assembly of parts;

FIGURE 2 is an enlarged elevation of the reciprocating drive unit forming a part of FIGURE 1;

FIGURE 3 is an end view of FIGURE 1;

FIGURES 4 and 5 illustrate separate embodiments of the troughs and conveying members, showing a number of the shapes of cross section which they may take;

FIGURES 6 and 7 are top views, respectively, of FIGURES 4 and 5;

FIGURES 8 and 9 are perspectives of the reciprocated conveyor members shown respectively in FIGURES 4 and 5;

FIGURES 10 and 11 are a plan and an elevation, respectively, of a modified drive unit;

FIGURE 12 is a section along the lines 12—12 in FIGURE 10;

FIGURE 13 is an elevation, partly in section, illustrating one form of hold-down applied to a conveyor rod;

FIGURE 14 is a section taken along the line 14—14 in FIGURE 13;

FIGURE 15 is an elevation, partly in section, showing weighting means;

FIGURE 16 is a section taken along the line 16—16 in FIGURE 15;

FIGURE 17 is a schematic elevation of another embodiment comprising a flexible conveyor member;

FIGURE 18 shows details of the conveyor in FIGURE 17;

FIGURE 19 is a section taken along the line 19—19 in FIGURE 18;

FIGURE 20 is a plan view of another flexible conveyor adapted for use in my apparatus;

FIGURE 21 is a side view of the conveyor in FIGURE 20, and

FIGURE 22 is a section taken along the line 22—22 in FIGURE 20.

Referring to FIGURES 1, 2 and 3, a mass of flowable solids, such as poultry feed, is supplied from hopper 10 through a discharge port 11. A sliding gate 12 is held by a suitable means such as locking bolt 13, at a level to permit the desired rate of flow from the hopper 10 through the port 11 into the trough 14. This is usually somewhat in excess of that which the conveying member 15 can advance within the trough 14 so that there is a constant replenishing of the supply from which the conveyor 15 draws. In a typical installation, the trough 14 may be V-shaped, about 4.5 inches wide at the top, 2.75 inches deep, and provided with inwardly extending flanges about 0.375 inch wide. The conveyor member 15 may comprise a rod about 0.375 to 0.5 inch square.

The conveyor assembly, comprising the conveying member 15, is caused to move in a push-pull fashion within the trough 14 by a reciprocating power unit or assembly, two forms of which are shown in the drawings.

One end of the conveying arm 15 is connected to the power unit by means of a pin and yoke 18 on the link 19. In FIGURES 1, 2 and 3, the walking beam 27 connects with a crank pin 21 on the driving plate 20 arranged to be rotated by a power source 22, which may be an electric motor, and transmission or gear reducer 22a, the motor 22 being supplied with electrical current through leads 23 and 24.

Fulcrum rollers or cams 25 and 26 are provided on opposite sides of the walking beam 27 and are supported by laterally projecting arm 28 carried by upright support 29. The walking beam may be about 0.25 inch wide and about 8 inches from crank pin to link 19; and the crank means has a crank arm of about 1 inch. The bumpers, which may suitably be rollers, are spaced about 0.75 inch from each other and about 1.75 to 2.0 inches from the center of rotation of the crank means.

As the crank means, comprising for example the plate 20 and the crank pin 21, is rotated, the beam 27 slides longitudinally downward between the bumpers 25 and 26 until the lowest point is reached at which time the beam 27 pivots momentarily about the bumper 25 and draws the conveyor member 15 rapidly rearwardly. On the balance of the clockwise rotation of the crank pin 21, the lower end of the beam 27 and the lateral link 19 move the bar 15 slowly forward through the trough 14 to advance the feed which is deposited in its advanced position by its inertia when the rod 15 is jerked back as described.

The vertical spacing of the pair of bumper cams or roller fulcrums 25 and 26 below the shaft on which the crank means is rotated determines the relative speeds of the advancing and return strokes of the conveying member 15. The lateral spacing of the fulcrums 25 and 26 with respect to the shaft also adjusts the length of the stroke of 15 and the relative speeds of the two strokes. The projecting arm 28, supporting the rollers 25 and 26, can be vertically and laterally adjusted by means of the tapered slot 29a in the upright 29.

Another embodiment of a reciprocating drive means is shown in FIGURES 10 and 11. The rod 15 is pivoted to one end of the link bar 19, the other end of link bar 19 being pivoted at 47 to the beam 45 which reciprocates about the pivot point 50 in the anchor bracket 46. The beam 45 is provided with a cam slot 49 which engages the McGill cam follower or crank pin 48 which is carried by rotated drive plate 44. A motor 41 having leads 23 and 24 supplies the power through coupling 43 to the speed reducer 42. The drive plate 44 is rotated thereby causing the pin 48 to travel within the slot 49 in the beam 45 which then oscillates about the pivot 50 in the anchor plate 46. This causes the link 19 and conveyor rod 15 to reciprocate within the trough 14 as previously described. Upon the forward motion in the trough, the rod moves slowly and, upon the return stroke, it is virtually jerked from under the advanced feed. This is effected by the beam 45, the slot 49 and the cam follower 48.

Upon the return stroke of the rod 15, the rapid travel causes the rod 15 to slide under the feed advanced within the trough 14 by the previous "push" or slow delivery stroke of the arm 15. This cycle is repeated at a rate of from about 30 to 50 strokes a minute with feed being supplied to the inlet end of the trough 14 by suitable means such as a hopper 10. As illustrated, this is done by gravity flow through the port 11 below the adjustable gate. When the feed already discharged from the port 11 is moved down the trough, more feed comes in to take its place but it does not continue to discharge if the feed piles up in front of port 11, i.e., when the conveying member is at rest.

Until the trough is filled to the desired extent, the conveying arm 15 continues to oscillate within the trough 14 (and along the bottom of the hopper 10), bringing feed from the hopper into the trough and advancing feed from the inlet end of the trough to the terminal end. Finally, the advanced feed reaches and piles up against the hinged switch-actuating end plate 30.

The weight of the hinged plate 30 at the end of the trough 14 is sufficient to hang vertically but when feed is pushed against it by the reciprocated conveyor assembly, the plate swings toward the end of the trough 14 and depresses switch 31. This switch may suitably be of the spring-loaded micro-type and is in the lead 24 or 23 to motor 22 or operates an independent on-off switch (not shown) which controls the actual power to the motor 22. Movement of the plate 30, in any event, cuts off the power thereby automatically stopping the motor 22 and hence the push-pull action of the conveying member 15. A timer 34 controls the power source to the motor 22 to run the motor at selected intervals for selected periods. However, the switch 31 over-rides the timer 34 as described above during the feeding period and stops the conveyor member when the trough 14 becomes filled to the desired level or extent.

If it is desired to by-pass the switch 31 for any reason, it is merely necessary to swing the plate 30 upwardly about its hinge 30a and out of the path of the feed. This may be done, for example, when it is desired to remove all feed from the trough 14, by opening the trap door 36 and by closing port 11. It may be desired to have several trough units in series fed from a single hopper. In that event, the door 36 remains open and the feed advanced in the trough 14 is discharged onto the inlet end of another trough unit similar to trough 14 described above. The switch plate 30 on the first unit trough is lifted to by-pass the switch 31 but a corresponding plate and switch on the final trough unit or section in the series controls the reciprocating power unit.

A plurality of agitator fingers, upstanding or lateral, may be provided on the portion of the conveying member which operates within the hopper 10 to avoid any tendency of the feed to bridge. The free end of the member 15 extends through a slot in the end wall 33 of the trough 14, the slot serving as an end guide for the reciprocating member 15. Alternatively, a sleeve (not shown) may be fixed to the bed of the trough near the terminal end to receive the reciprocating end of the arm 15. Other holddowns can be devised by those skilled in the art.

For example, in FIGURES 10, 11 and 12, holddown bars 40 are fixed to the inner walls of the trough 14. These bars 40 may be sections of the stock from which the rod 15 is made. Incidentally, a preferred stock for the rod 15 is wooden square rods about 0.75 inch on a side, lengths of which may be joined to produce a rod of the desired length. I may, for example, use angle irons 54 for this purpose or for merely weighting the rods 15 to cause them to hug the bottom of the trough 14 as shown in FIGURE 16. Whether used as joints or for weights, the leading edge of the irons 54 on the return stroke is suitably tapered or sloped as shown to minimize carryback of the advanced feed.

Another hold-down means is illustrated in FIGURES 13 and 14 including a cross block 51 extending between or under the flanges 14a of the trough and being provided with a notch 53 to guide the resilient wire 52 which has its ends embedded in the rod 15. With a stroke of about 6 inches, the wire 52 is about 12 to 14 inches in length.

Referring to FIGURES 4 to 9 of the drawings, the trough 14 is V-shaped. The conveying member 15 may be round as in FIGURE 4 where the rod is of the type used in reenforcing concrete or square as in FIGURE 5. In addition, it may be half-round, triangular, etc., and may be solid or tubular. The member 15 may be a rod having a plurality of peripheral grooves providing feed-engaging shoulders in the feed advancing stroke. Whatever its form, it operates within the trough out of the way of the feeding poultry and can be adapted for use in existing feeding trough designs. Since it is in the trough, it rides on or is in the feed, making for silent operation.

Referring to FIGURES 17 to 22, inclusive, the feeder comprises a trough 14a, a hopper 10a, a conveyor 15a, and a power unit 41–50 which drives the conveyor 15a in a pull-pull fashion through the trapezoidal frame including the flexible conveyor 15a, a pair of end levers 65 and 66 on pivot supports 67 and 68, the tie wire 70 and spring 69 between the upper ends of levers 65 and 66, and the drive bar 19 linked to lever 65 by pivot 18.

In FIGURES 17 and 18, the conveyor 15a comprises the cones 60 having cylindrical projections 61 and threaded on a wire or cable 62 with plastic tubing spacers 63 intermediate the cones 60.

The cones 60 may be made of wood, plastic or metal and are characterized by advancing feed when moved in unison from right-to-left and by riding over the advanced feed when moved from left-to-right. The spring 69 permits the conveyor 15a to rise on the return stroke from left-to-right and this further results in by-passing advanced feed on the return stroke and improves the efficiency of the conveyor.

The conveyor in FIGURES 20, 21 and 22 is similar to that of FIGURES 17 and 18 but the pusher members 64 comprise truncated triangles with a broad base 64a and a rearwardly and downwardly sloping top surface 64b. In this way the broad face 64a advances feed and inclined top surface 64b plows the advance feed, spreading it to the side of the trough. For use with this conveyor, the trough preferably has a flat bottom which may be somewhat wider than the base 64a of the pusher 64.

It will be understood that, although the invention has been described with respect to a single trough, it is contemplated that non-linear flights of trough in closed circuit may be provided with a conveyor member 15 in each flight of the trough 14. The conveyor members are reciprocated in unison, being linked, for example, by a cross lever which is centrally pivoted between the trough sections and at its ends to the adjacent ends of the conveyor member. Flexible cable connectors running over pulleys may also be used. Reciprocation of one end of the conveyor member as described effects flow of solids in series through the trough sections. Such non-linear flights may be parallel with a U-bend trough at the remote end. Likewise, the parallel troughs may be unitary, taking the form of a trough which is W-shaped in cross section with a conveyor rod running in each valley of the trough.

In most examples, the conveying arm 15 is shown as resting on the floor of the trough 14. However, it is contemplated that the member 15 may be operated within a channel on the bottom of the trough, in a tube or trough above the bottom of the trough, or on a riser, preferably with a guide channel to accommodate the reciprocating member. Likewise, the drive unit may comprise a pair of tandem solenoids, a driven cam and spring, pneumatic or hydraulic drives with quick spring returns, etc. These and other modifications of apparatus components and equivalent elements can be used in the apparatus without departing from the spirit of the invention.

This application is a continuation-in-part of my co-pending applications Serial No. 376,591, filed August 26, 1953, for "Chicken Feeder with Reciprocable Conveyor," and Serial No. 391,471, filed November 12, 1953, for "Poultry Feeder with Reciprocable Rod Conveyor in Open Trough," now abandoned.

What I claim is:

1. A stock feeder comprising in combination open-topped trough means affording access to stock, a feed supply means discharging thereinto, reciprocable conveying means in said trough means, means for actuating said conveying means, said conveying means comprising an elongated flexible linear member having feed-engaging portions therealong, and hold-down means reciprocated with said linear member and coacting with said trough means at spaced points intermediate the ends thereof thereby to guide the said member there-along and to retain the feed engaging portions therewithin.

2. The feeder of claim 1 having at least two depending levers projecting into said trough means, and wherein a length of said conveying means is linked to said depending lever and the lower end thereof, which levers are fixedly spaced at the other ends and are reciprocated by said means for actuating the conveying means, and wherein said feed-engaging portions are arranged transverse to the path of movement of said linear member.

3. A conveyor system for flowable solids comprising in combination an open-topped distribution trough means, an elongated conveying member arranged for reciprocation longitudinally of said trough means, hold-down means carried by said conveying member and coacting with the side walls of said trough means to guide said member within said trough means, solids-engaging portions on said member, means for reciprocating said member, hold-down means acting on said member to retain said solids-engaging portions within said trough, and means in said trough for controlling the operation of the last-mentioned means for reciprocating in response to the accumulation of distributed solids within said trough means.

4. The system of claim 3 wherein said conveying member is a rod having projections thereon to provide the solids-engaging portions, and wherein said hold-down means engages said member intermediate the ends thereof.

5. A conveyor system for flowable solids comprising in combination a distribution trough means, an elongated conveyor member arranged for reciprocation longitudinally within said trough, feed-engaging portions on said member, said feed-engaging portions being spaced from each other along said member and being fixed relative thereto, said distribution trough means being open-topped and having a lateral width and total cross section substantially greater than the width and cross section of said member and feed-engaging portions, reciprocating drive means for moving said member within said trough forwardly and rearwardly whereby the forward movement of the member advances the solids in the trough and the rearward movement leaves the solids in the advanced position.

6. The system of claim 5 wherein the trough means has inwardly and downwardly sloping walls converging to form a bottom portion, and said conveyor comprises an elongated member of small cross-sectional dimensions having feed-engaging portions arranged symmetrically of the axis of said member and said conveyor is slidably cradled by said sloping walls in said bottom portion of the trough means.

7. The system of claim 5 including a trough means having a generally V-shaped cross section, the sloping walls of said trough subtending an angle of about 90°, and said conveyor member conforms to said sloping walls and is provided with fixed feed engaging portions astride said member.

8. The system of claim 5 wherein the reciprocating means comprises a driven crank means, a walking beam having one end pivoted to said crank means, and the other end pivoted to an end of said conveying member, and a pair of spaced pivot means straddling said walking beam intermediate the pivoted ends thereof.

9. The conveyor system of claim 5 wherein the conveying member is a rod having a plurality of peripheral grooves providing the solids-engaging portions.

10. A feeder comprising in combination an open-topped trough means, a conveying member slidably disposed within said trough adjacent the bottom thereof, a link bar pivoted to one end of said member, means for reciprocating said member, said last-mentioned reciprocating means including a motor, transmission, a drive plate, and a drive pin means actuating a pivoted beam, and adapted to move said member slowly in one direction to advance feed and rapidly in the opposite direction to deposit the advanced feed.

11. The feeder of claim 10 wherein the beam follows a pair of opposed fulcrum points comprising a pair of spaced rollers.

12. The feeder of claim 10 wherein the beam is pivoted at one end to an anchor plate and is provided with a cam following slot embracing said drive pin means.

13. In a poultry feeder comprising in combination a distribution trough means which is open-topped and which affords access to stock, a feed supply means discharging thereinto, reciprocatable conveying means in said trough means, and means for actuating said conveying means, the improved conveying means which comprises a normally flexible elongated linear member with spaced pusher elements thereon and tubular spacers on said member between said pusher elements, depending levers extending into said trough means, said conveying means being retained in extended linear array by means of said pivoted depending levers linked to lengths of said member, said linear array being reciprocated along the bottom of said trough means, and tie means connected between said levers.

14. The feeder of claim 13 wherein said flexible conveyor is connected at linearly spaced points to the depending levers, at least one of which is driven.

15. A feeder comprising in combination an open-top trough means, a feed supply means discharging thereinto, reciprocable conveyor means in said trough means, means for actuating said conveyor means, said conveyor means comprising an elongated flexible linear member having feed-engaging portions therealong, and hold-down means spaced at intervals along the trough, intermediate its ends, and engaging the said linear member to retain said feed-engaging portions within said trough.

16. A feeder of claim 15, wherein the means for actuating the said conveyor means comprises two levers, one lever pivotally supported at the discharge end of the trough, the other pivotally supported at the receiving end of the trough, means to connect the said conveyor means between the levers at the bottom of the trough, tie means to connect the levers, and means to drive at least one of the levers to reciprocate the conveyor means.

17. The feeder of claim 15 wherein said flexible linear member comprises a stretched flexible cable with spaced pusher elements thereon and tubular spacers on said cable between said pusher elements, and said actuating means comprises means for reciprocating said conveying means.

18. The feeder of claim 17 wherein said pusher elements are generally triangular in cross section in the plane of the longitudinal axis of said cable the base of said triangular element being the leading portion on a feed-advancing stroke and the apex of said element being the leading portion on the return stroke.

19. The feeder of claim 17 wherein said pusher elements comprise cones.

20. The feeder of claim 17 wherein said pusher elements comprise trapezoidal blocks.

References Cited in the file of this patent

UNITED STATES PATENTS

| | | |
|---|---|---|
| 371,695 | McNeill | Oct. 18, 1887 |
| 840,542 | Wells | Jan. 8, 1907 |
| 1,821,644 | Jones | Sept. 1, 1931 |
| 2,552,743 | Simpson | May 15, 1951 |
| 2,595,941 | Hapman | May 6, 1952 |
| 2,699,250 | Keen et al. | Jan. 11, 1955 |
| 2,785,792 | Cordis | Mar. 19, 1957 |

FOREIGN PATENTS

| | | |
|---|---|---|
| 780,979 | France | Feb. 18, 1935 |